United States Patent
Lockridge et al.

(10) Patent No.: US 7,924,872 B2
(45) Date of Patent: Apr. 12, 2011

(54) TRANSPORT NETWORK MULTIPLEXING FOR TRANSPORT AND ETHERNET PACKETS

(75) Inventors: Terry Wayne Lockridge, Indianapolis, IN (US); Daniel Thomas Wetzel, Indianapolis, IN (US); Mike Arthur Derrenberger, Fishers, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1099 days.

(21) Appl. No.: 10/569,616

(22) PCT Filed: Aug. 27, 2003

(86) PCT No.: PCT/US03/26879
§ 371 (c)(1),
(2), (4) Date: Feb. 24, 2006

(87) PCT Pub. No.: WO2005/032019
PCT Pub. Date: Apr. 7, 2005

(65) Prior Publication Data
US 2007/0064727 A1    Mar. 22, 2007

(51) Int. Cl.
*H04J 3/16* (2006.01)
(52) U.S. Cl. ........................................ 370/466
(58) Field of Classification Search .......... 379/1.01, 379/9, 14; 370/229, 235, 236
See application file for complete search history.

(56) References Cited

U.S. PATENT DOCUMENTS

| | | | |
|---|---|---|---|
| 5,838,678 A | 11/1998 | Davis et al. | |
| 6,215,789 B1 * | 4/2001 | Keenan et al. | 370/399 |
| 6,526,064 B1 * | 2/2003 | Bousquet | 370/441 |
| 6,557,031 B1 | 4/2003 | Mimura et al. | |
| 6,785,733 B1 | 8/2004 | Mimura et al. | |
| 6,798,769 B1 * | 9/2004 | Farmwald | 370/352 |
| 7,031,904 B1 * | 4/2006 | Wilson et al. | 709/230 |
| 7,039,048 B1 * | 5/2006 | Monta et al. | 370/389 |
| 7,100,020 B1 * | 8/2006 | Brightman et al. | 712/18 |
| 7,151,784 B2 | 12/2006 | Sato et al. | |
| 2001/0028629 A1 * | 10/2001 | Uneyama et al. | 370/205 |
| 2002/0021695 A1 * | 2/2002 | Fantin | 370/389 |
| 2002/0059614 A1 * | 5/2002 | Lipsanen et al. | 725/75 |
| 2003/0027559 A1 * | 2/2003 | Umstetter et al. | 455/415 |

(Continued)

FOREIGN PATENT DOCUMENTS

JP    11-88439    3/1999

(Continued)

OTHER PUBLICATIONS

Search Report dated Feb. 9, 2004.

*Primary Examiner* — Chi H Pham
*Assistant Examiner* — Fan Ng
(74) *Attorney, Agent, or Firm* — Robert D. Shedd; Paul P. Kiel; Brian J. Dorini

(57) ABSTRACT

A system for multiplexing a transport packet and an Ethernet packet comprises a transport interface for receiving a transport stream comprising the transport packet and a network interface for receiving a network stream comprising the Ethernet packet. The system comprises a packet identifier coupled to the transport interface for filtering the transport stream and selecting the transport packet and a date formatter coupled to the network interface for creating a transport header appended to the Ethernet packet. The system further comprises a multiplexer for receiving the transport packet from the packet identifier, for receiving the Ethernet packet from the data formatter, and for multiplexing the transport packet and the Ethernet packet comprising the transport header.

20 Claims, 3 Drawing Sheets

U.S. PATENT DOCUMENTS

| | | | |
|---|---|---|---|
| 2003/0152078 A1* | 8/2003 | Henderson et al. | 370/389 |
| 2004/0022536 A1* | 2/2004 | Koh et al. | 398/41 |
| 2004/0252717 A1* | 12/2004 | Solomon et al. | 370/466 |

FOREIGN PATENT DOCUMENTS

| | | |
|---|---|---|
| JP | 11-341054 | 12/1999 |
| JP | 2000-078555 | 3/2000 |
| JP | 2000-278319 | 10/2000 |
| JP | 2000-278319 A | 10/2000 |
| JP | 2002-305530 | 10/2002 |
| JP | 2003-032563 | 1/2003 |
| WO | 9959078 | 11/1999 |
| WO | 01/37570 A1 | 5/2001 |

* cited by examiner

| | |
|---|---|
| ETHERNET HEADER | |
| IP HEADER | |
| UDP/TCP HEADER | |
| DATA PAYLOAD | |

FIG. 2

| | |
|---|---|
| SINC BYTE | 0X47 |
| TRANSPORT ERROR INDICATOR | 0 (UNLESS THERE IS AN ERROR) |
| PAYLOAD UNIT START INDICATOR | 0 |
| TRANSPORT PRIORITY | 0 |
| PID | PROGRAMMABLE |
| TRANSPORT SCRAMBLING CONTROL | 00 |
| ADAPTATION FIELD CONTROL | 01 |
| CONTINUITY COUNTER | INCREMENT |
| PAYLOAD | DATA |

FIG. 3

TRANSPORT NETWORK MULTIPLEXING FOR TRANSPORT AND ETHERNET PACKETS

BACKGROUND OF THE INVENTION

This application claims the benefit, under 35 U.S.C. § 365 of International Application PCT/US03/26879, filed Aug. 27, 2003, which was published in accordance with PCT Article 21(2) on Apr. 7, 2005 in English.

1. Field of the Invention

The present invention relates to network communications, and more particularly to a transport network multiplexer.

2. Discussion of the Related Art

Low cost video decoder integrated circuits do not have the means to receive 100BaseT LAN data while simultaneously receiving broadcast data.

Therefore, a need exists for a transport network multiplexer.

SUMMARY OF THE INVENTION

According to an embodiment of the present invention, a method for multiplexing a transport packet and an Ethernet packet comprises receiving a transport stream comprising the transport packet and a network stream comprising the Ethernet packet at a transport interface and a network interface, respectively and filtering the transport stream to select at least the transport packet. The method further comprises appending a transport header to the Ethernet packet, and selecting one of the transport packet and the Ethernet packet for output.

According to an embodiment of the present invention, a system for multiplexing a transport packet and an Ethernet packet comprises a transport interface for receiving a transport stream comprising the transport packet and a network interface for receiving a network stream comprising the Ethernet packet. The system comprises a packet identifier coupled to the transport interface for filtering the transport stream and selecting the transport packet and a data formatter coupled to the network interface for creating a transport header appended to the Ethernet packet. The system further comprises a multiplexer for receiving the transport packet from the packet identifier, for receiving the Ethernet packet from the data formatter, and for selecting one of the transport packet and the Ethernet packet comprising the transport header for output.

BRIEF DESCRIPTION OF DRAWINGS

Preferred embodiments of the present invention will be described below in more detail, with reference to the accompanying drawings:

FIG. 2 is an illustration of a network packet;

FIG. 3 is an illustration of an MPEG2 transport packet according to an embodiment of the present invention.

DETAILED DESCRIPTION

According to an embodiment of the present invention, a transport network multiplexer multiplexes network packets and broadcast packets together. Network packets can come from a LAN network and are typically an Internet Protocol (IP) packet.

Broadcast packets are packets that come from a satellite, terrestrial cable, etc. Broadcast packets typically use an MPEG transport specification.

Since broadcast packets comprise timing information that is important for video system performance, they take precedence over network packets, although the priority can be programmable. In broadcast packets, an MPEG transport layer wraps the payload data and there is no need to add additional data to the packet as compared to network packets where a transport header is added.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 1:
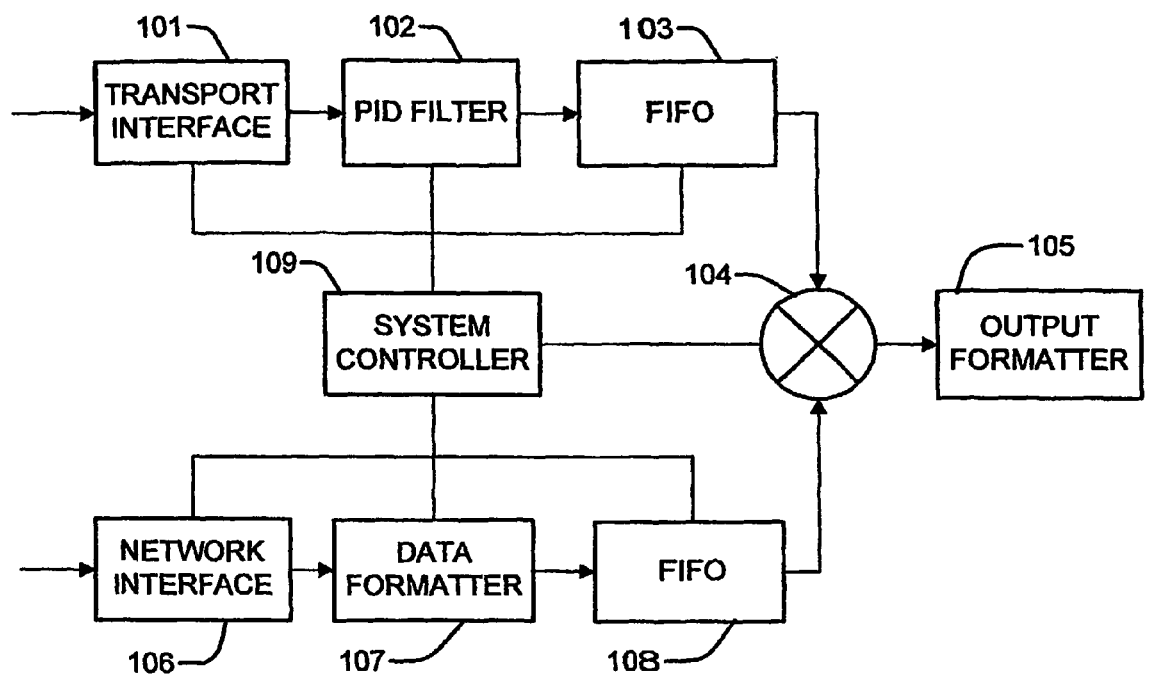
FIG. 1 is a diagram of a transport network multiplexer according to an embodiment of the present invention.

FIG. 1 shows a diagram of the functions that are provided by a transport network multiplexer according to an embodiment of the present invention. The transport interface 101 receives a transport stream. The packet identifier (PID) filter 102 filters the transport stream, selecting desired transport packets. The desired transport packets are stored in a buffer 103 to allow a transmission to be completed. The transport packet is sent through a multiplexer 104 and to the output formatter 105. The output formatter converts the data stream into an appropriate format needed to interface with an external hardware transport.

The network interface 106 receives packets from a network and forwards the data to the data formatter 107. The network data can be, for example, IP packets. The format of a typical IP packet is shown in FIG. 2.

The data payload of some Ethernet packets may comprise MPEG2 transport packets for audio, video, and other real-time streaming data. These transport packets are preserved, and passed directly to the output formatter. In this case, the Ethernet, IP, and UDP headers can be discarded.

Other Ethernet packets may comprise other general-purpose data. Examples of general-purpose data include http (e.g., web) and email data. Because general-purpose data does not comprise transport packets, the header information needs to be preserved. The entire Ethernet network packet is encapsulated in multiple transport packets, so that the Ethernet packet can be transmitted efficiently to the system's CPU. The size of an Ethernet packet can be as large as 1500 bytes. The packets in an MPEG2 transport stream are fixed at 188 bytes in length and packets in a DirecTV transport stream are fixed at 130 bytes in length. The packets are reformatted for transmission to an external transport front-end. The data formatter 107 breaks the network packet into smaller transport packets and applies the appropriate transport headers to the network packet. The data formatter 107 creates a transport header. The parameters of the header are programmable from an external host. For an MPEG2 stream, a header is created as shown in FIG. 3.

After the header has been created, the first 184 bytes of the network packet are appended to the header. A new header is created, and the network packet's next 184 bytes are appended. This continues until the data of a network is wrapped with a transport header. If there is not enough data to complete a transport packet, the transport packet is padded, for example, with zeros.

It should be noted that for DBS (Direct Broadcast Satellite) applications the header comprises the following fields: packet framing; bundle boundary; control flag; control sync; service channel ID; continuity counter; header designator; and payload. The DBS packet is 127 bytes long. Thus, for DBS network packets, 127 byte blocks are appended to the header until the data of the network is wrapped.

The start of a new Ethernet packet needs to be indicated in the newly created transport stream of general-purpose data. According to an embodiment of the present invention, an adaptation field that is available as an extension to the transport header can be used to indicate the start of a new Ethernet packet. Start and end indicators can be added in this way. According to another embodiment of the present invention, one of the bits already in the header, e.g., payload unit start indicator, can be used to indicate the start of a new Ethernet packet. The adaptation field is usable by any MPEG2 system.

The new packets are stored in a buffer 108 until ready to be transmitted (e.g., until a complete packet is received). The system control inserts the new transport packets when there is a free slot between the transport packets from the upper path in FIG. 1. The new packets are sent through the multiplexer 104, multiplexed with the transport packets, and sent to the output formatter 105.

The system controller 109 is configured by an external host to control the PID filter 102 and data formatter 107. The system controller 109 is signaled by the buffers 103 and 108 (e.g., FIFOs) upon a buffer receiving a complete a packet. The multiplexer 104 is controlled by the system controller 109 allowing data to flow from the buffers 103 and 108 to the output formatter 105. Since the system controller 109 is configured to know which interface is carrying video packets, the system controller 109 configures the multiplexer 104 to give the video path's buffer priority over the other buffer.

Figure 4:
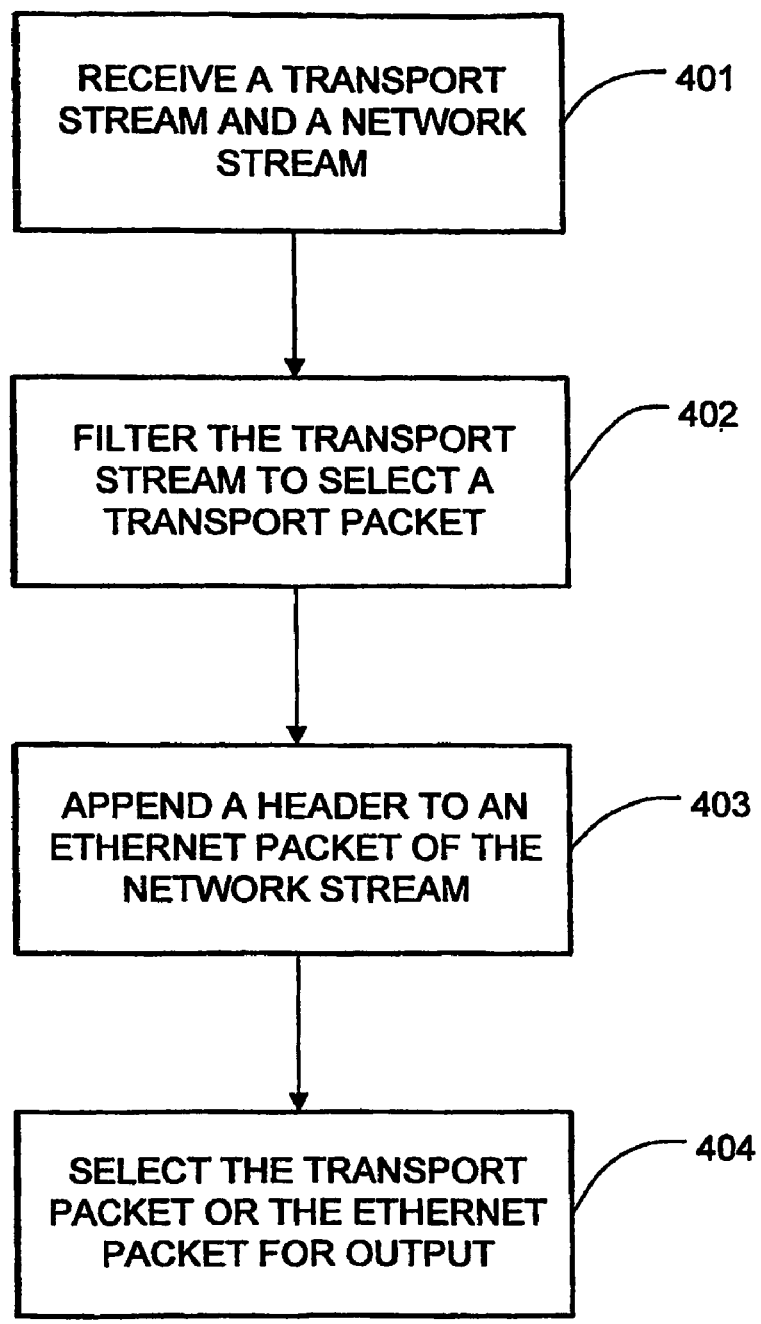
FIG. 4 is a flow chart of a method according to an embodiment of the present invention.

Referring to FIG. 4, according to an embodiment of the present invention, a method for multiplexing a transport packet and an Ethernet packet comprises receiving a transport stream comprising the transport packet and a network stream comprising the Ethernet packet at a transport interface and a network interface, respectively 401. The transport stream is filtered to select at least the transport packet 402. The method further comprises appending a transport header to the Ethernet packet 403, and selecting one of the transport packet and the Ethernet packet for output 404.

Having described embodiments for a transport network multiplexer, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A method for processing a transport packet and an Ethernet packet comprising:

receiving at a transport interface a transport stream comprising the transport packet and receiving at a network interface a network stream comprising the Ethernet packet formatted in compliance with an Ethernet specification, the transport packet formatted in compliance with a first protocol specification different from the Ethernet specification;

filtering the transport stream to select at least the transport packet;

encapsulating the Ethernet packet such that the Ethernet packet header information is preserved, the encapsulating including appending a transport header to at least a portion of the Ethernet packet to form a reformatted packet formatted in compliance with the first protocol specification; and selecting one of the transport packet and the reformatted packet for output into an output stream of packets, wherein the output stream of packets is formatted in compliance with the first protocol specification, wherein selecting further comprises giving priority to the transport packet over the reformatted packet.

2. The method of claim 1, further comprising formatting the output stream of packets into an appropriate format for external transport.

3. The method of claim 1, wherein selecting further comprises buffering a portion of the transport packet until transmission of the transport packet is complete.

4. The method of claim 3, wherein buffering further comprises:

signaling a system controller upon the receipt of a complete transport packet; and transmitting the transport packet to a multiplexer.

5. The method of claim 1, wherein selecting further comprises buffering a portion of the reformatted packet until transmission of the reformatted packet is complete.

6. The method of claim 5, wherein buffering further comprises:

signaling a system controller upon the receipt of a complete reformatted packet; and transmitting the reformatted packet to a multiplexer.

7. A system for processing a transport packet and an Ethernet packet comprising:

a transport interface for receiving a transport stream comprising the transport packet, the transport packet formatted in compliance with a first protocol specification;

a network interface for receiving a network stream comprising the Ethernet packet formatted in compliance with an Ethernet specification, wherein the first protocol specification is different from the Ethernet specification;

a packet identifier coupled to the transport interface for filtering the transport stream and selecting the transport packet;

a data formatter coupled to the network interface for encapsulating the Ethernet packet such that the Ethernet packet header information is preserved, the encapsulating including appending a transport header to at least a portion of the Ethernet packet, to form a reformatted packet formatted in compliance with the first protocol specification;

a multiplexer for receiving the transport packet from the packet identifier, for receiving the reformatted packet from the data formatter, and for selecting one of the transport packet and the reformatted packet for output into an output stream of packets, wherein the output stream of packets is formatted in compliance with the first protocol specification; and a system controller for controlling the multiplexer to give priority to the transport packet over the reformatted packet.

8. The system of claim 7, further comprising an output formatter for formatting the output stream of packets into an appropriate format for external transport.

9. The system of claim 7, further comprising a buffer disposed between the packet identifier and the multiplexer for storing the transport packet.

10. The system of claim 7, further comprising a buffer disposed between the data formatter and the multiplexer for storing the reformatted packet.

11. The system of claim 10, further comprising a system controller for controlling the buffer.

12. A program storage device readable by machine, tangibly embodying a program of instructions, which when executed by the machine, cause the machine to perform a method for processing a transport packet and an Ethernet packet, the method comprising:

receiving at a transport interface a transport stream comprising the transport packet and receiving at a network interface a network stream comprising the Ethernet packet formatted in compliance with an Ethernet specification, the transport packet formatted in compliance with a first protocol specification different from the Ethernet specification;

filtering the transport stream to select at least the transport packet;

encapsulating the Ethernet packet such that the Ethernet packet header information is preserved, the encapsulating including appending a transport header to at least a portion of the Ethernet packet to form a reformatted packet formatted in compliance with the first protocol specification; and selecting one of the transport packet and the reformatted packet for output into an output stream of packets, wherein the output stream of packets is formatted in compliance with the first protocol specification, wherein selecting further comprises giving priority to the transport packet over the reformatted packet.

13. The device of claim 12, further comprising formatting the output stream of packets into an appropriate format for external transport.

14. The device of claim 12, wherein selecting further comprises buffering a portion of the transport packet until transmission of the transport packet is complete.

15. The device of claim 14, wherein buffering further comprises:

signaling a system controller upon the receipt of a complete transport packet; and transmitting the transport packet to a multiplexer.

16. The device of claim 12, wherein selecting further comprises buffering a portion of the reformatted packet until transmission of the reformatted packet is complete.

17. The device of claim 16, wherein buffering further comprises:

signaling a system controller upon the receipt of a complete reformatted packet; and transmitting the reformatted packet to a multiplexer.

18. The method of claim 1, wherein the first protocol specification includes an MPEG transport specification.

19. The method of claim 7, wherein the first protocol specification includes an MPEG transport specification.

20. The method of claim 12, wherein the first protocol specification includes an MPEG transport specification.

* * * * *